United States Patent
Praveenkumar et al.

(10) Patent No.: US 9,306,992 B2
(45) Date of Patent: Apr. 5, 2016

(54) METHOD AND SYSTEM FOR USING WI-FI DISPLAY TRANSPORT MECHANISMS TO ACCOMPLISH VOICE AND DATA COMMUNICATIONS

(71) Applicant: QUALCOMM Incorporated, San Diego, CA (US)

(72) Inventors: Sanigepalli V. Praveenkumar, San Diego, CA (US); Vijay N. Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/912,492

(22) Filed: Jun. 7, 2013

(65) Prior Publication Data

US 2014/0365611 A1    Dec. 11, 2014

(51) Int. Cl.
G06F 15/16 (2006.01)
H04L 29/06 (2006.01)
H04W 4/06 (2009.01)
H04W 4/10 (2009.01)
H04W 8/00 (2009.01)
H04L 29/08 (2006.01)
H04W 76/00 (2009.01)
(Continued)

(52) U.S. Cl.
CPC ............ *H04L 65/4069* (2013.01); *H04L 67/16* (2013.01); *H04L 69/24* (2013.01); *H04W 4/06* (2013.01); *H04W 4/10* (2013.01); *H04W 8/005* (2013.01); *H04W 76/005* (2013.01); *H04W 4/008* (2013.01); *H04W 76/023* (2013.01); *H04W 84/12* (2013.01)

(58) Field of Classification Search
None
See application file for complete search history.

(56) References Cited

U.S. PATENT DOCUMENTS

2011/0107388 A1    5/2011    Lee et al.
2011/0149806 A1    6/2011    Verma et al.
(Continued)

FOREIGN PATENT DOCUMENTS

WO    2014116959 A1    7/2014

OTHER PUBLICATIONS

Gardner-Stephen, "The Serval Project: Practical Wireless Ad-Hoc Mobile Telecommunications," Aug. 3, 2011, 13 pages, Retrieved Mar. 21, 2013 from URL http://developer.servalproject.org/site/docs/2011/Serval_Introduction.html.

(Continued)

*Primary Examiner* — Esther B Henderson
(74) *Attorney, Agent, or Firm* — The Marbury Law Group, PLLC

(57) ABSTRACT

Systems and methods of communicating voice communication signals and video content over a WiFi ad hoc network and within the framework of Miracast/Wi-Fi Direct standards may include a first wireless-enabled mobile device configured to establish a Miracast session with a second wireless-enabled mobile device, enter a Miracast mirroring mode in which the first wireless-enabled mobile device establishes itself as a source device so that content output to the speaker and electronic display of the first wireless-enabled mobile device is also displayed on the speaker and electronic display of the second wireless-enabled mobile device, detect user input indicating that the push-to-send over Miracast features should be activated, activate a microphone and/or camera to capture voice communications, images, and/or video content, and transmit the captured voice communications, images, and/or video content to the second wireless-enabled mobile device.

45 Claims, 9 Drawing Sheets

(51) Int. Cl.
　　　*H04W 4/00*　　　(2009.01)
　　　*H04W 84/12*　　(2009.01)
　　　*H04W 76/02*　　(2009.01)

(56) References Cited

U.S. PATENT DOCUMENTS

| | | | |
|---|---|---|---|
| 2012/0178368 A1 | 7/2012 | Fleck et al. | |
| 2013/0002949 A1 | 1/2013 | Raveendran et al. | |
| 2013/0033435 A1 | 2/2013 | Raveendran et al. | |
| 2013/0346562 A1* | 12/2013 | Kim | 709/219 |
| 2014/0096165 A1* | 4/2014 | Bei et al. | 725/81 |
| 2014/0351480 A1* | 11/2014 | Lee et al. | 710/303 |

OTHER PUBLICATIONS

Wi-Fi.org, "Wi-Fi Certified Miracast: Now showing on screens everywhere," 2013 W-Fi-Alliance, 2 pages, Retrieved Mar. 21, 2013 from URL: http://www.wi-fi.org/wi-fi-certified-miracast%E2%84%A2.

Duong T. N., et al., "Content Sharing Using P2PSIP Protocol in Wi-Fi Direct Networks", Communications and Electronics (ICCE), 2012 Fourth International Conference on, IEEE, XP032245594, DOI: 10.1109/CCE.2012.6315881 ISBN: 978-1-4673-2492-2, Aug. 1, 2012, pp. 114-118.

International Search Report and Written Opinion—PCT/US2014/041147—ISA/EPO Nov. 26, 2014.

Wi Fi Alliance: "Wi-Fi Certified Miracast (TM): Extending the Wi-Fi Experience to Seamless Video Display", Internet Citation, Sep. 19, 2012, pp. 1-18, XP002700078, Retrieved from the Internet URL:https://www.wi-fi.org/sitestdefault/files/uploadsfwp_Miracast_Industry_29129919.pdff.

* cited by examiner

US 9,306,992 B2

METHOD AND SYSTEM FOR USING WI-FI DISPLAY TRANSPORT MECHANISMS TO ACCOMPLISH VOICE AND DATA COMMUNICATIONS

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, smartphones, tablets, etc.) have become smaller, more powerful and more feature-rich than ever. Many of these devices now have impressive processing capabilities, large memories, and radios/circuitry for wirelessly sending and receiving information.

Wireless communication technologies have also improved over the past several years. Wireless local area networks are now replacing wired networks in many homes and offices. Short-range wireless technologies, such as Bluetooth® and WiFi, enable high speed communications between mobile electronic devices (e.g., cellular phones, watches, headphones, remote controls, etc.) that are within a relatively short distance of one another (e.g., less than 100 meters for Bluetooth®, etc.).

As mobile device and wireless technologies continue to improve and grow in popularity, short-range wireless technologies are expected to supplant or replace the need for connecting devices together using cables or wires. As part of this evolution, a number of new technologies and standards (e.g., Miracast, etc.) are beginning to emerge that allow high-speed unidirectional wireless communication between electronic devices. The use of these emerging technologies/standards in unconventional ways to provide users of mobile devices with access to new and improved communication services, functionalities, and capabilities will be beneficial to consumers of the mobile devices.

SUMMARY

The various embodiments include methods of communicating information over a Miracast infrastructure, which may include negotiating a wireless communication link over the Miracast infrastructure between a first mobile device and a second mobile device, establishing a Miracast session between the first mobile device and the second mobile device via the wireless communication link, detecting actuation of a first push-to-send button on the first mobile device, configuring the first mobile device as a source device in response to detecting actuation of the first push-to-send button, activating a microphone or camera of the first mobile device to capture audio or video in response to detecting actuation of the first push-to-send button, and transmitting audio or video captured by the microphone or camera of the first mobile device from the first mobile device to the second mobile device over the wireless communication link.

In an embodiment, the method may include establishing a back-channel wireless communication link between the first mobile device and the second mobile device over the Miracast infrastructure, detecting actuation of a second push-to-send button on the second mobile device, activating a microphone or camera of the second mobile device to capture audio or video in response to detecting actuation of the second push-to-send button, transmitting audio or video captured by the microphone or camera of the second mobile device from the second mobile device to the first mobile device over the wireless communication link, and receiving in the first mobile device audio or video data from the second mobile device over the back-channel wireless communication link.

In a further embodiment, negotiating a wireless communication link over the Miracast infrastructure between the first mobile device and the second mobile device may include performing capability negotiations operations that include determining whether the second mobile device is push-to-send receive capable. In a further embodiment, determining whether the second mobile device is push-to-send receive capable may include generating in the first mobile device an M3 communication message (RTP OPTIONS) that may include a push-to-send parameter, transmitting the M3 communication message from the first mobile device to the second mobile device, receiving in the second mobile device the M3 communication message that may include the push-to-send parameter, updating the received M3 communication message in the second mobile device by adding a push-to-send value to the push-to-send parameter, and transmitting the updated M3 communication message from the second mobile device to the first mobile device.

In a further embodiment, the method may include receiving the transmitted audio or video in the second mobile device, storing the received audio or video in a buffer of the second mobile device for a buffering duration, retrieving the audio or video stored in the buffer of the second mobile device, outputting the retrieved audio or video to a speaker or electronic display of the second mobile device, determining a playback quality of the outputted audio or video on the second mobile device, and adjusting the buffering duration in the second mobile device based on the playback quality. In a further embodiment, transmitting audio or video captured by the microphone or camera of the first mobile device from the first mobile device to the second mobile device over the wireless communication link may include duplicating information packets with time diversity to increase a communication range of audio or video transmitted from the first mobile device and a quality of the audio or video.

In a further embodiment, receiving in the first mobile device audio or video data from the second mobile device over the back-channel wireless communication link may include communicating in full duplex mode. In a further embodiment, transmitting the captured audio or video from the first mobile device to the second mobile device may include communicating in half duplex mode. In a further embodiment, the method may include detecting when the first mobile device is out of communication range of the second mobile device, and sending a communication message suitable for reestablishing the Miracast session or the wireless communication link from the first mobile device to the second mobile device in response to detecting that the first mobile device is out of communication range of the second mobile device. In an embodiment, sending the communication message suitable for reestablishing the Miracast session or the wireless communication link from the first mobile device to the second mobile device is performed repeatedly until an explicit tear down request is received in the first mobile device.

In a further embodiment, the method may include detecting low signal strength conditions in the first mobile device, capturing text in the first mobile device in response to detecting the low signal strength conditions, and transmitting the captured text in an M3 message from the first mobile device to the second mobile device via a real-time streaming protocol (RTSP) channel.

Further embodiments include a wireless-enabled device having a processor configured with processor-executable instructions to perform various operations corresponding to the methods discussed above.

Further embodiments include a wireless-enabled device that includes various means for performing functions corresponding to the method operations discussed above.

Further embodiments include a non-transitory processor-readable storage medium having stored thereon processor-executable instructions configured to cause a processor of a wireless-enabled device to perform various operations corresponding to the methods discussed above.

Further embodiments include a communication system for communicating information over a Miracast infrastructure. The communication system may include a first wireless-enabled device and a second wireless-enabled device, each having a device processor that may be coupled to a push-to-send button. The processor of the first and/or second wireless-enabled device may be configured with processor-executable instructions to perform operations for accomplishing any or all of the functions of the methods discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
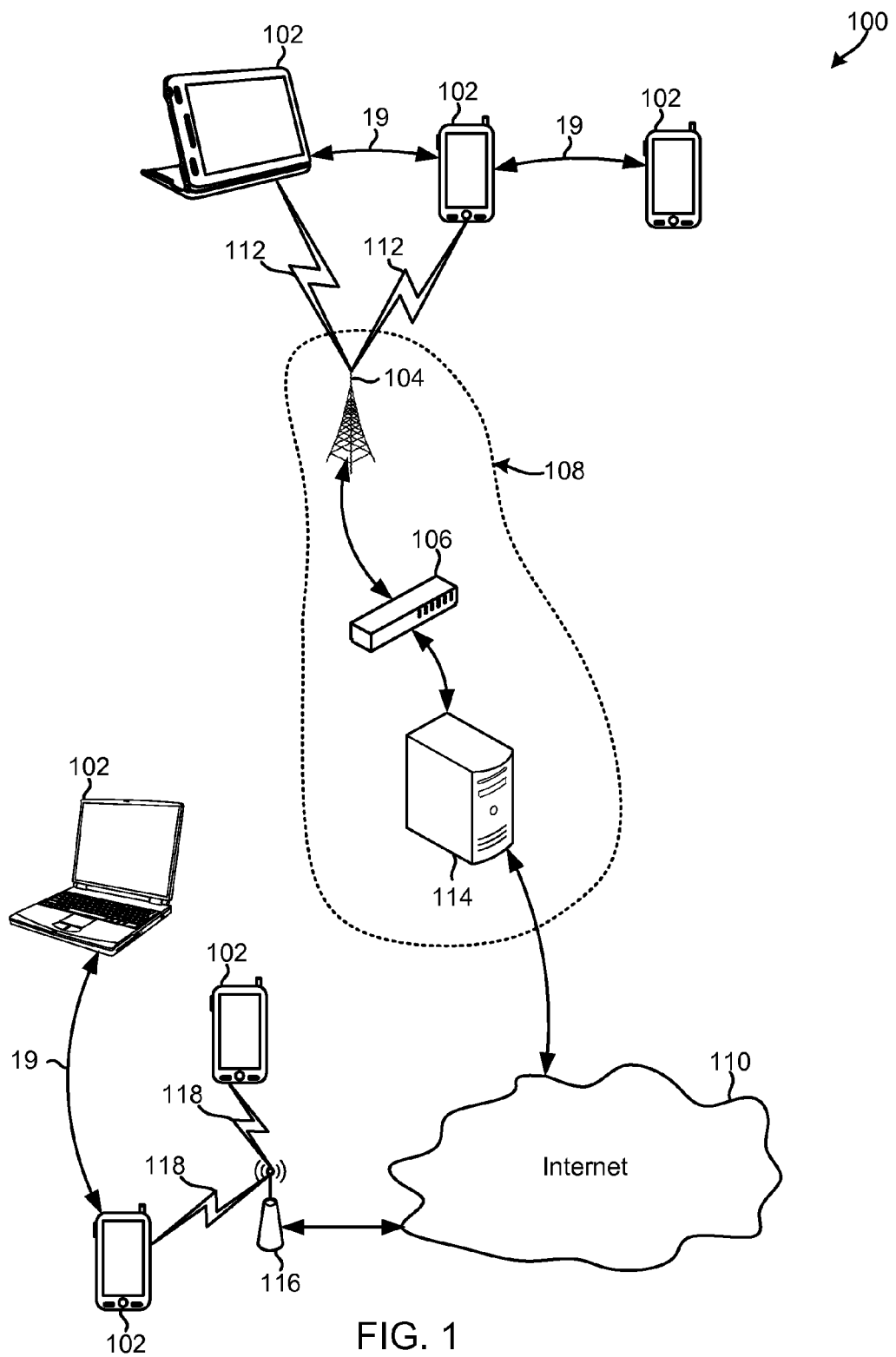
FIG. 1 is a communication system block diagram illustrating network components of an example telecommunication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

As used herein, the term "mobile device" may refer to any one or all of cellular telephones, smartphones, watches, wrist displays, personal or mobile multi-media players, personal data assistants (PDA's), tablet computers, laptop computers, netbooks, ultrabooks, palm-top computers, wireless electronic mail receivers, multimedia Internet enabled cellular telephones, wireless gaming controllers, and other similar personal electronic devices that include a programmable processor and circuitry for wirelessly sending and receiving information. While the various embodiments are particularly useful in mobile devices, such as smartphones, the embodiments are generally useful in any wireless-enabled device having communication circuitry for wirelessly sending or receiving information.

The term "wireless-enabled device" is used herein to refer to any electronic device that includes a radio frequency (RF) radio or circuitry for wirelessly sending or receiving information via a short wave wireless technology, such as Wi-Fi, and thus may encompass many commercially available mobile devices, medical devices, personal computers, server computers, smart televisions, set-top boxes, cameras, projectors, and other similar electronic devices. Details of the Wi-Fi standards and technologies are set forth in Institute of Electrical and Electronics Engineers' (IEEE) 802.11 standards, which are herein incorporated by reference for details related to the communication technologies.

As wireless technologies continue to improve and grow in popularity, short-range wireless technologies are expected to supplant or replace the need for connecting devices together using wires or cables. Miracast is a peer-to-peer wireless screencast technology/standard that allows users to wirelessly transmit audio and video content from a first wireless-enabled device (e.g., a tablet, smartphone, etc.) to a second wireless-enabled device (e.g., a television) without the use of wires or cables. For example, Miracast technology may allow a tablet device to relay content (e.g., a YouTube video stream) that would typically be displayed on that tablet's electronic display to a wireless-enabled television for display using the Wi-Fi radios included in the tablet and television devices.

Using existing solutions, the content rendered on the television screen mirrors that which is rendered on the tablet's electronic display.

Miracast eliminates the need to connect the devices using cables or wires (e.g., HDMI cable, USB cable, etc.) in order to share content by simplifying the process of forming a direct high speed wireless connection between two wireless-enabled devices. For example, Miracast enables a suitably configured wireless-enabled device to identify other suitably configured wireless-enabled devices within communication range, establish communication links to the identified devices, and coordinate the wireless transmission of content, all with little or no interaction from the users of the wireless-enabled devices. Miracast allows the devices to communicate directly, without a connection to the Internet or intermediate network component (e.g., wireless access point, etc.).

Miracast connections may be formed via Wi-Fi Direct, which allows direct peer-to-peer Wi-Fi connections without the need for an intermediate network component (e.g., server, wireless access point, etc.). In this manner, Miracast is similar to Bluetooth® in that the devices communicate directly. However, unlike Bluetooth®, the Miracast protocol/standard is well-suited for the communication of large volumes of information (e.g., compressed video files), operates via Wi-Fi communication links, and is unidirectional (or forward only).

Because the Miracast protocol/standard generally only supports unidirectional transfer of information, wireless-enabled devices that communicate via Miracast generally have the capability to operate as either a "source device" (i.e., a transmitter or source of the content) or "sink device" (i.e., a receiver or consumer of the content), but cannot simultaneously operate as both a source and a sink device.

The various embodiments include methods, systems, and devices configured to send and receive voice communication signals, video content and data messages over a WiFi ad hoc network within the framework of Miracast/Wi-Fi Direct standards, in either a half duplex or full duplex fashion. Various embodiments may include mobile devices configured to communicate via Miracast/Wi-Fi Direct standards when a connection to the Internet or cellular communication network is not available, such as in emergency situations.

Generally, cellular communication networks are designed to accommodate access requests from only a fraction of the total number of wireless devices in a particular cell. That is, cellular communication networks are designed based on the presumption that only a small subset of mobile device users will attempt to access the network at any given time. In emergency situations, there is often a sudden spike in the number of cell phone calls as anxious people try to reach their family members or call for help (e.g., police, 911). If the electrical power grid is affected, the cellular network may be forced to revert to battery-based or backup stations, reducing the number of resources available to subscribers affected by the emergency. In the event of natural disasters like earthquakes and hurricanes, a significant number of cell towers may be knocked out of commission for an extended period of time. These and other factors often combine to overload the cellular networks in emergency situations, causing service outages and/or long wait times before calls can get through.

In addition to the difficulties associated with communicating via a cellular communication network during times of emergency, wide area network (WAN) coverage, such as that provided by 3G and other telecommunication networks, can be unreliable or spotty in certain locations (e.g., in mountains, inside buildings, etc.). Thus, solutions that attempt to prioritize access to the network or otherwise manage or improve network access during times of emergency or high call volume are not always suitable or sufficient for enabling voice, video, or data communications between mobile devices due to the inconsistent reliability of such networks due to terrain, carrier planning, network failures, etc.

Further, when cellular networks are unable, mobile device users will often make repeated unsuccessful attempts to access the network to place calls or send electronic messages (SMS or email). These repeated attempts may drain the mobile device's battery, cause collisions with other mobile devices, and further contribute to overloading the cellular network. The increased battery drain can become a problem in situations where the power remains out for an extended period of time or the individual is trapped in a location where recharging the battery is impossible. This can lead to mobile devices running out of battery power, leaving their users without communication capabilities when the cellular networks recover.

The various embodiments include mobile devices configured to form or use a wireless ad hoc network to communicate voice, video and data in the absence of telecommunications infrastructure, which may reduce network congestion, enable communications during emergency situations or poor network coverage, and allow mobile devices to make intelligent battery usage decisions.

A wireless ad hoc network is a decentralized wireless network that does not rely on a preexisting infrastructure (e.g., routers, access points, etc.) because individual nodes in the network can participate in routing and forwarding data to the other nodes in the network. However, existing wireless ad hoc network technologies are only suitable for communicating data (e.g., instant messages, etc.), are not reliable or efficient, and/or do not support communicating voice signals or large volumes of video content. Further, existing solutions are proprietary, require an Internet or data connection, and/or require a connection an intermediate server (e.g., for authentication, access to client software, etc.).

The various embodiments include mobile devices configured to communicate voice signals, video, and data messages over direct and high speed peer-to-peer communication links, without requiring any of the mobile devices to have access to the Internet, a telecommunication network, or to an intermediate server or component. As such, the various embodiments enable audio communications at times when WAN coverage is not available, such as during emergency situations or other events that causes cellular service to be limited or overwhelmed.

In an embodiment, a wireless-enabled mobile device may be configured to automatically initiate a process for establishing a communication link suitable for sending and/or receiving voice communication signals, video content, and/or data messages over a WiFi network within the framework defined by Miracast/Wi-Fi Direct standards in response to detecting the presence of an emergency situation or other events that cause cellular service to be limited, congested, or otherwise unavailable. In this manner, the wireless-enabled mobile device may communicate directly with other wireless-enabled devices in close proximity without requiring any of the devices to have access to the Internet, a telecommunication network, a wireless access point, server, or any other intermediate component.

In an embodiment, a first wireless-enabled mobile device may be configured to establish a Miracast session with a second wireless-enabled mobile device, enter a Miracast mirroring mode in which the first wireless-enabled mobile device establishes itself as a source device so that content output to the speaker and electronic display of the first wireless-enabled mobile device is also displayed on the speaker and electronic display of the second wireless-enabled mobile device, detect user inputs indicating that the push-to-send over Miracast features should be activated, activate in response to such a user input a microphone and/or camera to capture voice communications, images, and/or video content, and transmit the captured voice communications, images, and/or video content to the second wireless-enabled mobile device via the Miracast link in lieu of transmitting the content that is output to the speaker and electronic display of the first wireless-enabled mobile device.

In an embodiment, the full duplex voice communication may be accomplished between the first and second wireless-enabled mobile devices over a Wi-Fi ad hoc network within the framework specified in the Miracast/Wi-Fi Display standard via the use of a user input back channel (UIBC) to communicate voice communication signals from the second wireless-enabled mobile device to the first wireless-enabled mobile device.

In an embodiment, when both the first and/or second wireless-enabled mobile devices detect user input indicating that the push-to-send over Miracast features should be activated, a group owner in the Wi-Fi network may evaluate various push-to-send options, policies, and rules of the system, and select one of the first and second wireless-enabled mobile devices to operate as a source device, at least initially. In an embodiment, the group owner may select the wireless-enabled mobile device that first detected a user input indicating that the push-to-send over Miracast features should be activated as the source device.

In an embodiment, the first and/or second wireless-enabled mobile device may be configured to disconnect the Miracast session only when there is an explicit tear down request received from the other device. When the first and/or second wireless-enabled mobile devices are moved out of communication range of each other, or when they experience low signal strength conditions so that communications fail, one or both of the devices may perform operations to attempt to re-establish the Miracast session until an explicit tear down request is received from the other device. In an embodiment, the first and/or second wireless-enabled mobile device may be configured to modify a "keep alive" timer to take into account signal strength conditions.

In an embodiment, the first and/or second wireless-enabled mobile device may be configured to enter a text-only mode in low signal strength conditions to communicate text payloads, which involve far less data than voice communications, over a transmission control protocol (TCP) channel. In an embodiment, the text payloads may be communicated as M3 messages using a real-time streaming protocol (RTSP) channel. In an embodiment, the text payloads may be communicated over a low-priority data channel that is negotiated in advance (e.g., via capability negotiations).

In an embodiment, the first and/or second wireless-enabled mobile devices may be configured to define and/or generate a new real-time streaming protocol (RTSP) message (e.g., a new M message type) suitable for carrying text message payloads over the user input back channel (UIBC) channel.

In a further embodiment, the first and second wireless-enabled mobile devices may be configured to identify, select, set or negotiate various features within the Miracast System and/or perform capability negotiation operations by communicating M messages using real-time streaming protocol (RTSP). For example, the first and/or second wireless-enabled mobile devices may be configured to perform user input back channel (UIBC) capability negotiation operations to choose a data encapsulation type, configure or select a TCP port, and enable or disable the UIBC. When enabled, information may be communicated over the UIBC using a TCP port identified during UIBC capability negotiation operations.

In a further embodiment, the first and second wireless-enabled mobile devices may be configured to negotiate a user input forward channel (UIFC), either in addition to or instead of the UIBC. The UIFC may be the reverse of the UIBC so that information may be communicated from the source device to the sink device over the UIFC, and from the sink device to the source device over UIBC. In various embodiments, the first and/or second wireless-enabled mobile devices may be configured to communicate text messages, audio communications and/or video data using one or both of the UIBC and UIFC channels, such as in response to detecting low signal strength conditions.

The various embodiments may make use of a variety of communication systems, examples of which are illustrated in FIG. 1. The communication system 100 illustrated in FIG. 1 includes a cellular telephone network 108, which typically includes a plurality of cellular base stations 104 coupled to a network operations center 106 operable to connect voice and data calls between mobile devices 102 (e.g., mobile phones) and to other network destinations, such as via telephone land lines (e.g., a POTS network, not shown) and the Internet 110. Communications between the mobile devices 102 and the network 108 may be accomplished via two-way wireless communication links 112, such as 4G, 3G, CDMA, TDMA, and other cellular telephone communication technologies. The cellular telephone network 108 may also include one or more servers 114 coupled to or within the network operations center 106 that provide a connection to the Internet 110.

The mobile devices 102 may also include wireless communication links 118 to a wireless access point 116 that provides a connection to the Internet 110. The mobile devices 102 may establish direct peer-to-peer connections 120 to other mobile devices 102 via short-range wireless technologies, such as Wi-Fi. The direct peer-to-peer connections 120 may be established directly between the mobile devices 102 without any intervening network components or devices by using Wi-Fi Direct, Wi-Fi P2P, Tunneled Direct Link Setup (TDLS), and/or Miracast technologies or protocols. The direct peer-to-peer connections 120 may be established between two or more mobile devices 102 irrespective of whether any of the connected mobile devices 102 include communication links to the telecommunication network 108, to the Internet 110, or to an intermediate component, such as a router, server, or wireless access point 116.

Figure 2:
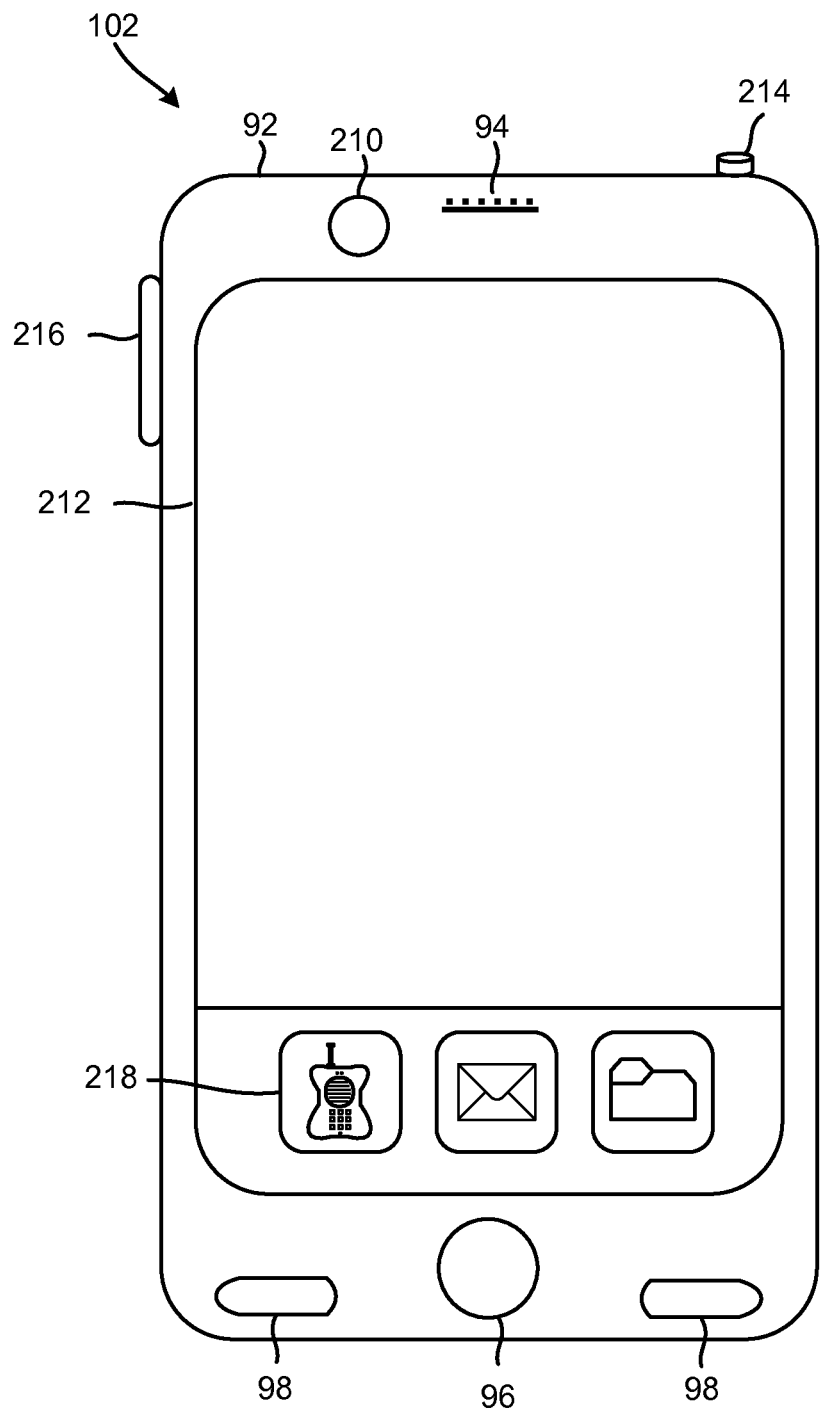
FIG. 2 is an illustration of a mobile device that includes various sensors and user interface components suitable for use with the various embodiments.

FIG. 2 illustrates sample components of an embodiment mobile device 102 in the form of a smartphone 202. The smartphone 202 may include a speaker 204, a menu selection buttons 206 for receiving user inputs, one or more microphones 208 for capturing sounds, an antenna 214 for sending and receiving electromagnetic radiation, a front-facing camera 210 for capturing images and video, and an electronic display 212 for rendering video content and/or receiving user inputs. The smartphone 202 may also include one or more user interface elements 216, 218 (e.g., buttons) for initiating the process of activating the microphones 208 to sample sounds, activating the camera 210 to capturing images or video, establishing communication links, and/or performing other operations to accomplish functions of various embodiments. The user interface elements 216, 218 (e.g., buttons) may be implemented as hard key buttons, soft key buttons, as a touch keys, or any other way of receiving user input for initiating the sampling of sounds and/or video.

For ease of reference, the user interface elements 216, 218 are referred to herein as "push-to-talk" buttons or "push-tosend" buttons. However, it should be understood that the phrases "push-to-talk button" and "push-to-send button" are used generically and interchangeably herein to describe any user interface element (e.g., button) suitable for initiating the sampling of sounds, capturing of video, or establishing communication links suitable for the transmission audio signals, video content, or data messages using Miracast, Wi-Fi Direct, or other similar technologies.

Figure 3:
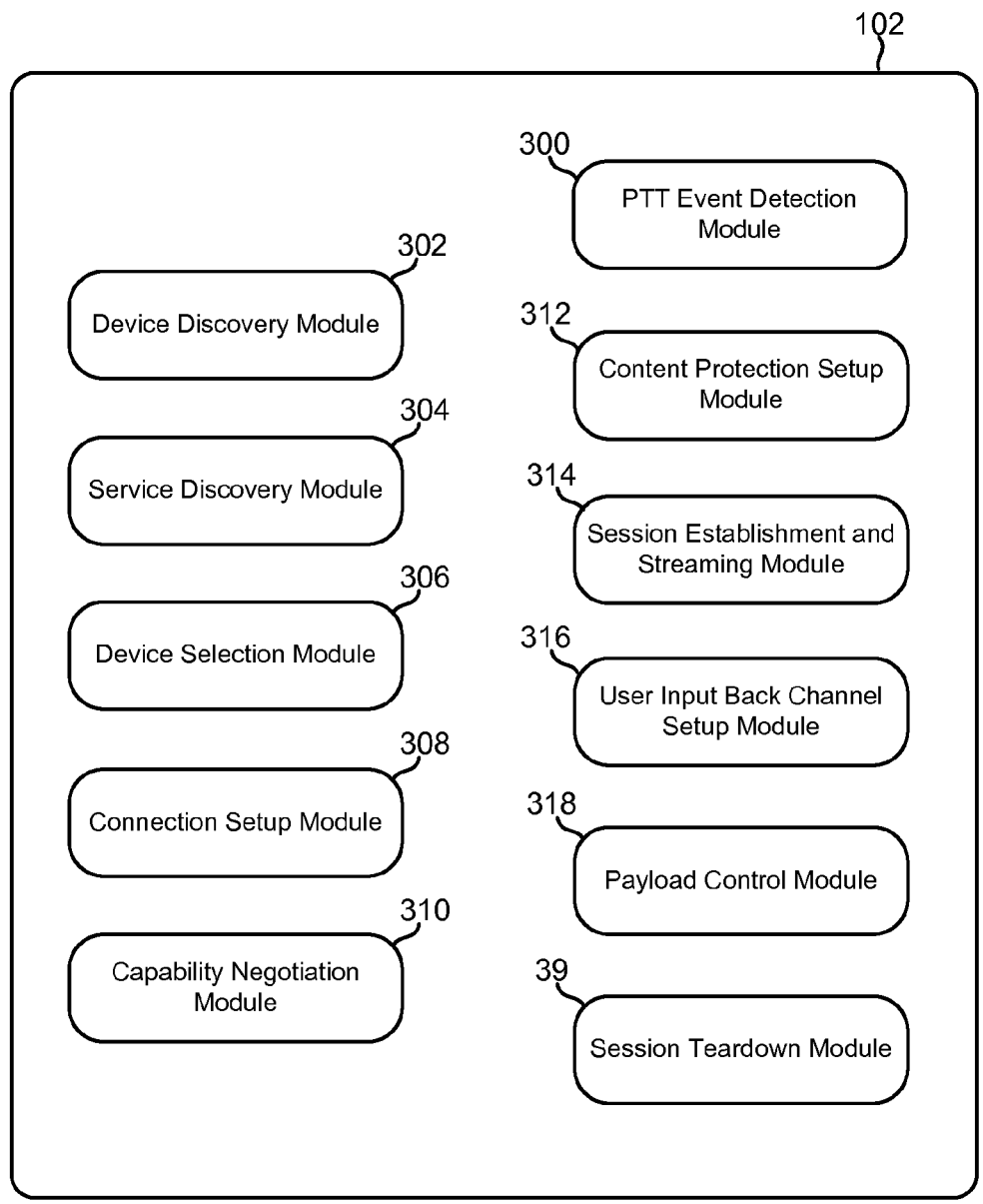
FIG. 3 is a block diagram illustrating various logical and functional components an embodiment mobile device.

FIG. 3 illustrates various logical and functional components/modules that may be included in an embodiment mobile device 102. Specifically, FIG. 3 illustrates that a mobile device 102 may include a push-to-talk (PTT) event detection 300 module, device discovery 302 module, a service discovery 304 module, a device selection 306 module, a connection setup 308 module, a capability negotiation 310 module, a content protection setup 312 module, a session establishment and streaming 314 module, a user input back channel (UIBC) setup 316 module, a payload control 318 module, and a session teardown 320 module.

The push-to-talk (PTT) event detection module 300 may be configured to detect various events and conditions that indicate to the mobile device 102 that the push-to-talk or push-to-send functionality is to be activated, such as the actuation of a push-to-send button 216, 218 of the mobile device.

The device discovery module 302 may be configured to perform various operations for discovering other wireless-enabled devices that are within the communication range of the mobile device 102, including activating Wi-Fi or short-range wireless transceivers of a wireless-enabled mobile device, broadcasting a discovery signal from the Wi-Fi radio or transceiver, and/or detecting discovery signals broadcast from the other wireless-enabled devices that are in communication range of the mobile device.

The service discovery module 304 may be configured to discover the service capabilities and/or Miracast compatibility of the discovered devices and/or to determine whether a communication link may be established with one or more of the discovered mobile devices. In various embodiments, this may be accomplished via Wi-Fi P2P, Miracast, TDLS, and/or WiFi Direct protocols.

The device selection module 306 may be configured to identify and select one of the discovered wireless-enabled devices to which a communication link is to be established. In various embodiments, the device selection module 306 may be configured to select a wireless-enabled device based on user input, user preferences, local policies, or policy rules, any or all of which may be stored in a memory of the mobile device 102.

The connection setup module 308 may be configured to select a connection establishment and/or management method or technology (e.g., Wi-Fi Direct, TDLS, etc.), establish a device-to-device or peer-to-peer communication link (e.g., WPA2 single-hop link, etc.) to the selected wireless-enabled device using the selected method/technology, establish a transmission control protocol (TCP) connection between the devices, and establish a real-time streaming protocol (RTSP) control port suitable for creating and/or managing a session between the devices.

The capability negotiation module 310 may be configured to determine the Miracast parameters for the Miracast session, which may include parameters suitable for determining whether one or more of the devices are push-to-send or push-to-talk (PTT) receive capable. The content protection setup module 312 may be configured to determine whether the devices support or require content protection (e.g., for an audio/video stream), and derive session keys for link content protection, e.g., using High-bandwidth Digital Content Protection (HDCP). In an embodiment, the content protection setup module 312 may be configured to derive HDCP session keys before an RTP session is initiated or established.

The session establishment and streaming module 314 may be configured to setup the Miracast session, which may be accomplished after the capability negotiation operations and prior to sending or receiving content over the established communication links. In an embodiment, the content may be packetized using Moving Picture Experts group 2 Transport Stream (MPEG2-TS) coding and IEEE 802.11 Wi-Fi technologies or protocols. In various embodiments, the content packets may be encapsulated using Real-Time Protocol (RTP), User Datagram Protocol (UDP), and/or Internet Protocol (IP) encapsulation technologies.

The UIBC setup module 316 may be configured to establish a communication channel (i.e., a UIBC) suitable for sending or receiving control and data information to and from a connected wireless-enabled device. For example, user inputs detected on the connected wireless-enabled device may be packetized using a UIBC packet header and transmitted back to the mobile device 102 via TCP/IP.

The payload control module 318 may be configured to adjust the transmission parameters based on channel conditions and power consumptions characteristics of the devices. The session teardown module 320 may be configured to perform various operations for tearing down or terminating the Miracast Session.

Figure 4:
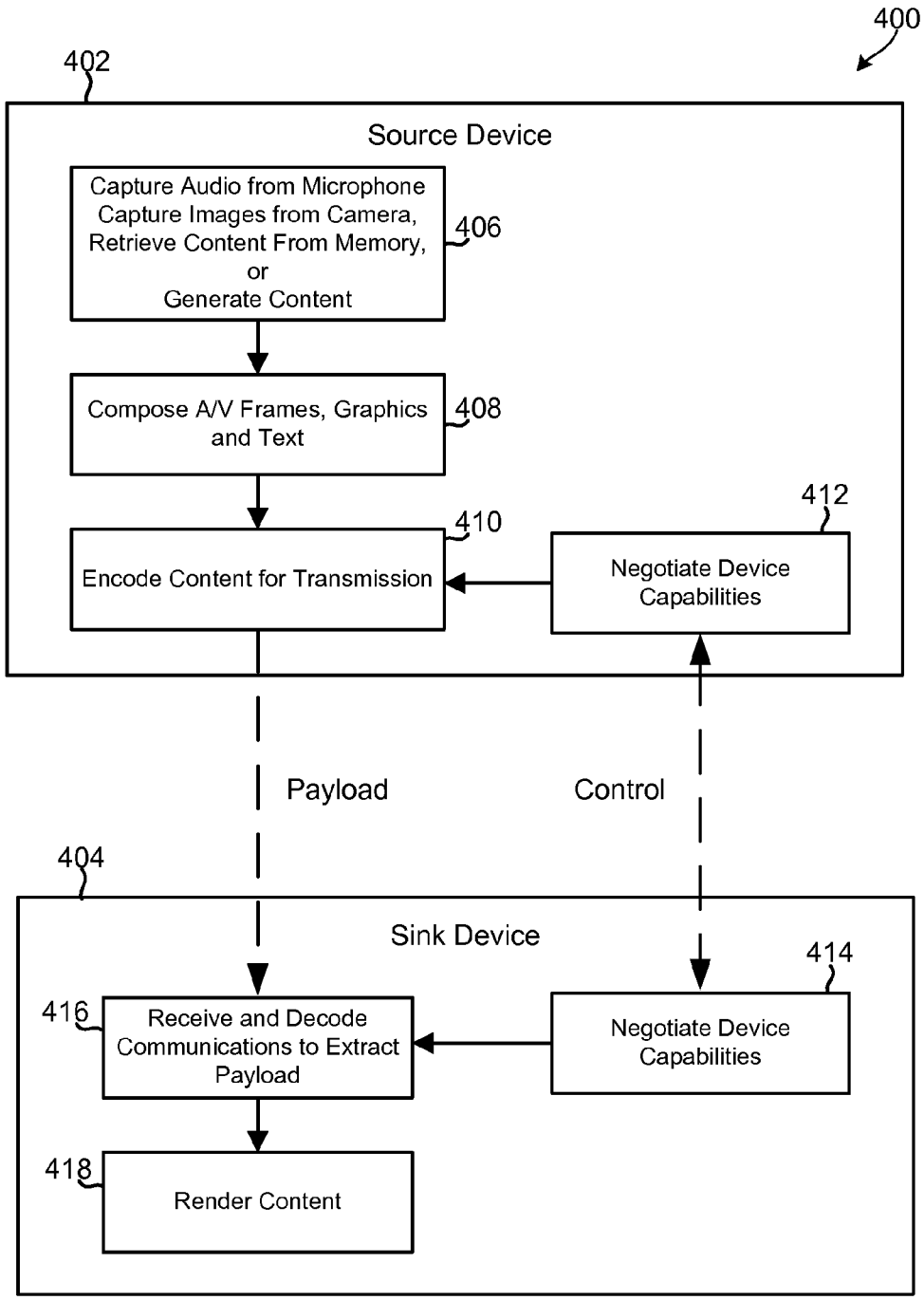
FIG. 4 is a block diagram illustrating various components, operations and information flows in an example Miracast communication system suitable for wirelessly communicating voice, video, and text content in accordance with an embodiment.

FIG. 4 illustrates various operations and information flows in an example Miracast communication system 400 suitable for wirelessly communicating voice, video, and text content in accordance with an embodiment. The illustrated Miracast communication system 400 includes a source device 402 and a sink device 404, each of which may be a wireless-enabled mobile device (e.g., smartphones, etc.) having a Wi-Fi radio or communication circuitry.

In blocks 412 and 414, the source and sink devices 402, 404 may perform various operations to establish a direct link between the source device 402 and the sink device 404 via Wi-Fi through the use of Wi-Fi P2P, Wi-Fi Direct, TDLS or other similar technologies. The direct link may be established between the source device 402 and the sink device 404 without an access point or server acting as an intermediary between the source and sink devices 402, 404.

As part of operations 412 and 414, the sink device 404 may be configured to broadcast an identifier message or signal, and the source device 402 may be configured to discover the identifier broadcast by the sink device 404 and determine if a pairing has previously been established between the source device 402 and the sink device 404. This may be accomplished by the source device 402 accessing information stored in memory to determine if it has had prior knowledge of the Media Access Control (MAC) address of the sink device 404. If the source device 402 determines that a pairing has previously been established with the sink device 404, the source device 402 may automatically establish a communication link the sink device 404 without further authentication. Otherwise, the source device 402 may perform various authentication operations to authenticate the sink device 404, and establish a direct communication link suitable for transporting audio, video, or text to the authenticated sink device 404.

Also as part of operations 412 and 414, the source device 402 and the sink device 404 may perform "capability negotiation" operations or any or all of the operations discussed above with reference to FIG. 3. For example, in operations 412 and 414, the source and sink devices 402, 404 may perform "capability negotiation" operations to indicate whether the sink device 404 is push-to-talk (PTT) receive capable. This may be accomplished using M3 messages of the Miracast protocol. For example, the source device 402 may send the sink device 404 an M3 message that includes a "wfd-ptt-capability" parameter, and the sink device 404 may respond with an M3 message that includes a value for the "wfd-ptt-capability" parameter when the sink device 404 determines that it is PTT compatible. For example, the sink device 404 may respond with an M3 message that includes an "Invalid Parameter" value for the "wfd-ptt-capability" parameter when the sink device 404 determines that it is not PTT capable.

Further, as part of the capability negotiations in operations 412 and 414, the source and sink devices 402, 404 may negotiate various transport parameters (e.g., UDP port, etc.) for both the forward and back channels, agree upon arbitration logic/rules for determining priority or the right to talk (e.g., based on detected the actuation of the PTT button first, etc.), determine a codec to be used for the communication, determine the buffering and error correction methodologies or rules that are to be used, etc.

In operation 406, the source device 402 may activate a microphone of the mobile device to capture audio samples, activate a camera of the mobile device to capture images or video, retrieve content from memory, or generate content that is to be transmitted to the sink device 404. In an embodiment, the source device 402 may be configured to activate the microphone or camera in response to detecting an actuation of a push-to-talk button in the source device 402.

In operations 408 and 410 the source device 402 may compose and encode the captured audio, video, or retrieved/generated content (i.e., payload) in a format suitable for transmission to the sink device 404 over the Miracast communication links, and send the encoded information to the sink device 404. In operation 416 the sink device 404 may receive and decode the information sent from the source device 402 to extract the payload. In operation 418, the sink device 404 may render the received information on the sink device 404. Rendering content may include outputting received audio information via a speaker of the sink device 404 or displaying received images or text messages on an electronic display of the sink device 404.

In an embodiment, the source and sink devices 402, 404 may exchange roles in response to the sink device 404 detecting that a push-to-talk button on the sink device 404 has been actuated. That is, when the user pushes a PTT button on the sink device 404, the sink device 404 may change modes to become a source mobile device that captures and sends voice, video and/or data communications back to the original source device 402 that is now a sink device via the existing communication links and/or without tearing down or terminating the Miracast session between the devices 402, 404.

Figure 5:
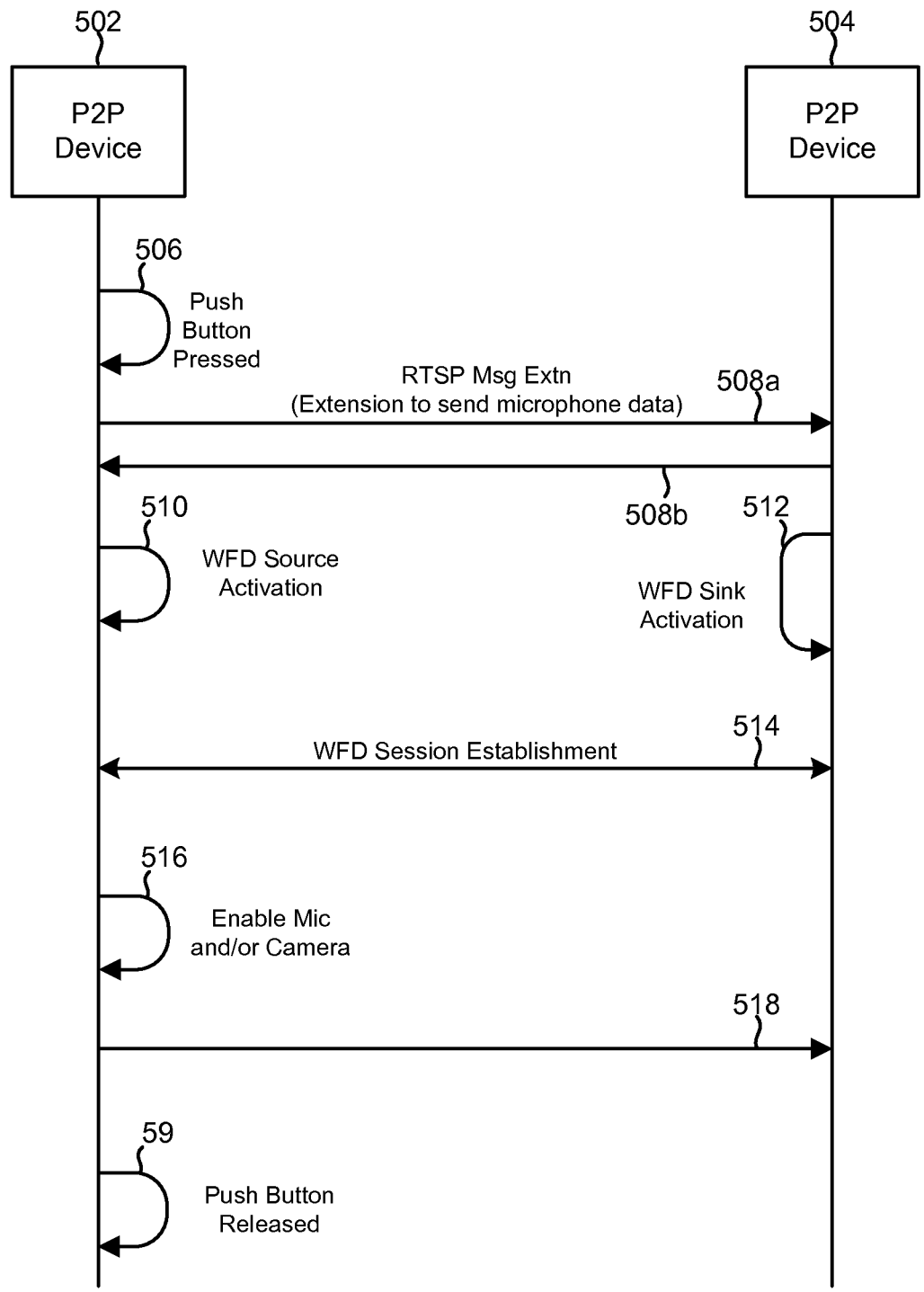
FIG. 5 is a process flow diagram illustrating an embodiment system method of communicating voice communication signals and video content between a first peer-to-peer (P2P) device and a second mobile device over a WiFi ad hoc network and within the framework of Miracast/Wi-Fi Direct standards.

FIG. 5 illustrates an embodiment method 500 of communicating voice communication signals and video content between a first mobile device 502 and a second mobile device 504 over a peer-to-peer WiFi ad hoc network and within the framework of Miracast/Wi-Fi Direct standards. In operation 506, the first mobile device 502 may determine that a PTT button on the device has been actuated or pressed. In operation 508*a*, the first mobile device 502 may send a real time streaming protocol (RTSP) message to the second mobile device 504 notifying it that the first mobile device 502 will operate as a source device to send voice communication signals, video content or data messages within the framework of Miracast/Wi-Fi Direct standard. The RTSP message may be extension to the existing Miracast protocol that re-uses existing Miracast infrastructures. In operation 508*b*, the second mobile device 504 may send a response or acknowledgment message to the first mobile device 502 indicating that the second mobile device 504 is capable of operating as a sink device to receive voice communication signals, video content or data messages via Miracast infrastructures.

As part of operations 508*a* and 508*b*, the first and second mobile devices 502, 504 may perform capability negotiation operations. In an embodiment, the capability negotiations may include negotiating communication ports for a forward communication link, a backward communication link, or both. In an embodiment, first and second mobile devices 502, 504 may agree to use the same codecs for both the forward and backward communication channels/links between the devices 502, 504. In an embodiment the same codecs may be used to accomplish Miracast Mirroring operations for both a forward and backward communication link.

In operation 510, the first mobile device 502 may perform Wi-Fi Direct source activation operations to establish and configure itself as a source device. In operation 512, the second mobile device 504 may perform Wi-Fi Direct sink activation operations establish and configure itself as a sink device. In operation 514, the first and second mobile devices 502, 504 may negotiate a Wi-Fi Direct communication link. In operation 516, the first mobile device 502 may activate a microphone of the device to capture sounds. In operation 516, in addition to or instead of activating the microphone, the first mobile device 502 may activate its camera to capture video content.

In operation 518, the first mobile device 502 may begin transmitting the captured audio and/or video to the second mobile device 504, which may be accomplished via Miracast Mirroring. In operation 520, the first mobile device 502 may determine that a PTT button on the device has been released, and in response, deactivate the microphone/camera and terminate the audio/video transmissions.

In an embodiment, the second mobile device 504 may be configured to detect the actuation of a PTT button on the second mobile device 504, and in response, capture and send audio and/or video content to the first mobile device 502 using the port negotiated at the beginning of the session and/or during the capability negotiation operations (i.e., in operations 508*a* and 508*b*). The first mobile device 502 may be configured to terminate audio/video transmission to receive, decode, and render audio/video content sent from the second mobile device 504 over the back channel (e.g., the UIBC channel, etc.). Thus, in an embodiment, first and second mobile devices 502, 504 may perform full duplex communications by negotiating additional ports for back-channel communications and achieving bilateral or two-way communications over WFD/Miracast systems.

Figure 6:
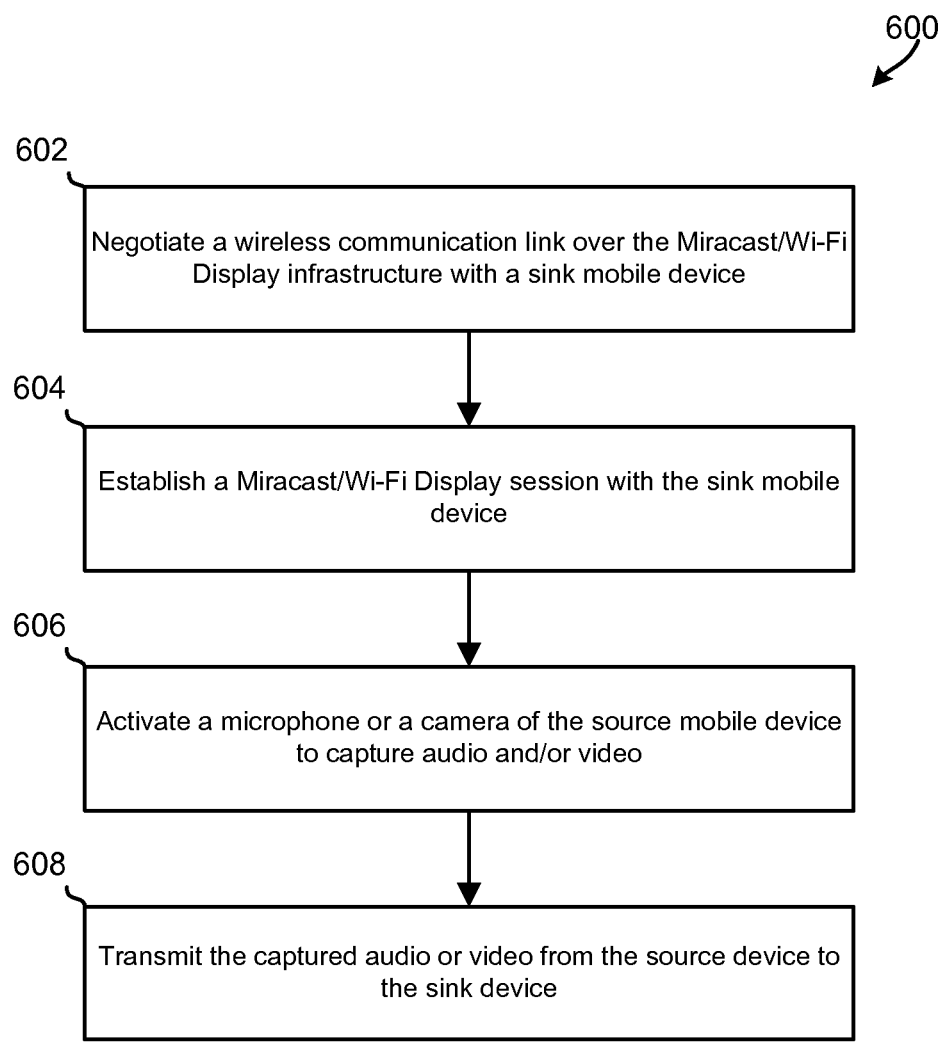
FIG. 6 is a process flow diagram illustrating an embodiment source device method of communicating voice communication signals, video content, and data messages over a WiFi ad hoc network and within the framework of Miracast/Wi-Fi Direct standard.

FIG. 6 illustrates an embodiment source device method 600 of communicating voice communication signals, video content, and data messages over a WiFi ad hoc network and within the framework of Miracast/Wi-Fi Direct standards. In block 602, a processor of a wireless-enabled source mobile device may negotiate a wireless communication link over the Miracast/Wi-Fi Display infrastructure with a wireless-enabled sink mobile device. In an embodiment, the source mobile device processor may negotiate the wireless communication link in response to detecting that the source mobile device is in communication range of the sink mobile device. In another embodiment, the source mobile device processor may negotiate the wireless communication link in response to determining that a PTT button of the source mobile device has been actuated or pressed.

In block 604, the source mobile device processor may establish a Miracast/Wi-Fi Display session with the sink mobile device. In block 606, the source mobile device processor may activate a microphone or a camera of the source mobile device to capture voice communication signals or video content. In an embodiment, the source mobile device processor may be configured to activate the microphone/camera in response to determining that a PTT button of the source mobile device has been actuated or pressed. In block 608, the source mobile device processor may transmit the captured voice communication signals or video content to the sink device. In an embodiment, the source mobile device processor may perform the operations of blocks 606 and 608 (i.e., capture and transmit audio or video content) until the source mobile device determines that the PTT button of the source mobile device has been released.

Figure 7:
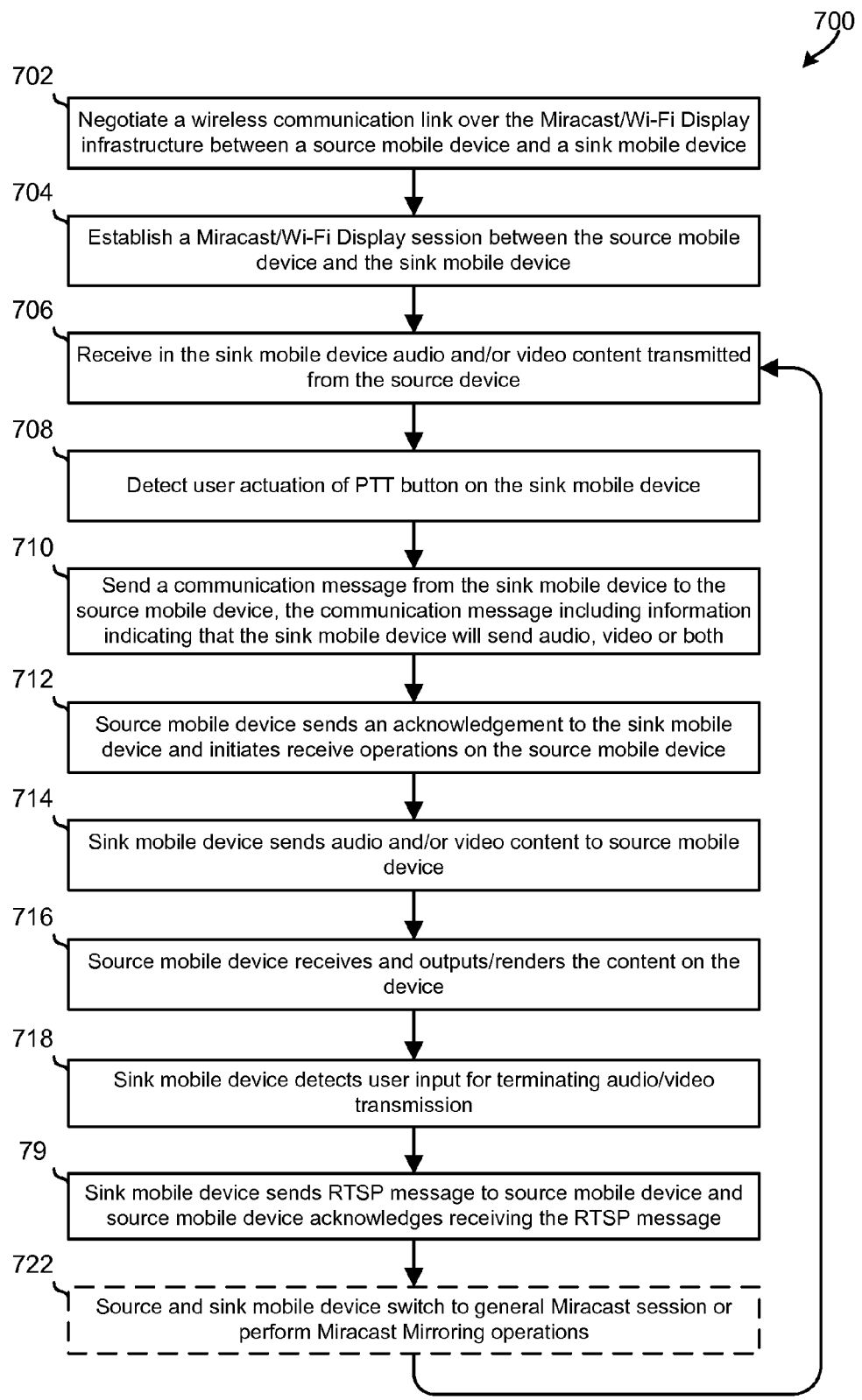
FIG. 7 is a process flow diagram illustrating another system method of communicating voice communication signals and video content over a WiFi ad hoc network and within the framework of Miracast/Wi-Fi Direct standards.

FIG. 7 illustrates an embodiment system method 700 of communicating voice communication signals and video content over a WiFi ad hoc network and within the framework of Miracast/Wi-Fi Direct standards. In block 702, a processor of a wireless enabled source mobile device may negotiate a wireless communication link over the Miracast/Wi-Fi Display infrastructure with a wireless enabled sink mobile device. In block 704, the source mobile device processor may establish a Miracast/Wi-Fi Display session with the sink mobile device. In block 706, the source mobile device processor may capture and transmit voice communication signals and/or video content to the sink mobile device, which may receive and render the content on a speaker and/or electronic display of the sink mobile device. In block 708, the sink mobile device processor may determine that a PTT button on the sink mobile device has been actuated or pressed. In block 710, the sink mobile device processor may send a communication message to the source mobile device indicating that the sink mobile device will send voice communication signals and/or video content to the source mobile device.

In block 712, source mobile device may send an acknowledgement communication signal or message to the sink mobile device, and initiate receive operations on the source mobile device (and thus effectively becoming a sink device). In block 714, the sink mobile device may capture and transmit voice communication signals and/or video content to the source mobile device (and thus effectively becoming a source device). In block 716, the source mobile device may receive and output/render the content transmitted from the sink mobile device.

In block 718, the sink mobile device processor may detect user input for terminating audio/video transmission, such as detecting that a user of the sink mobile device released the PTT button. In block 720, the sink mobile device processor may send an RTSP message to source mobile device, and the source mobile device processor may send and acknowledgment communication signal/message indicating that the RTSP message has been received in the source device. In optional block 722, the source and sink mobile device processor may switch to general Miracast session or perform general Miracast Mirroring operations. The operations of 706-722 may be repeated until the source and sink mobile devices are moved outside of communication range of one another, until a mobile device user terminates the connections or communications, or until one or both of the mobile devices establish a connection to a telecommunications network.

Mobile devices that support audio—only modes for peer-to-peer communications may also be configured to support a text-only mode, which may be particularly useful in low signal strength conditions as text requires a significantly smaller payload to communicate using TCP than audio data. Text-only mode messages may be sent as M3 messages using RTSP. Alternatively, a new data channel may be negotiated upfront to support text data transmissions. This new channel may be configured to be reliable and have low priority to minimize any interference with the real time nature of audio/video.

In an embodiment, the first and/or second wireless-enabled mobile device may be configured to enter the text-only mode to communicate text payloads in response to detecting low signal strength conditions. Text included in such text payloads may include text captured from a keyboard (e.g., via a user typing a text message) and/or text generated by a speech recognition algorithm processing detecting speech, or any another form of user input or communication. For example, the first wireless-enabled mobile device may be configured to detect low signal strength conditions, and in response, activate transcription software to convert audio captured from the device's microphone to words or text, and transmit the words/text to the second wireless-enabled mobile device over the Miracast/WiFi Display infrastructure in lieu of audio communications signals. The second wireless-enabled mobile device may be configured to receive the text payload and render the received text on the electronic display of the second device. The second wireless-enabled mobile device may also be configured to receive the text payload, generate audio from the received text, and output the generated audio to a speaker of the second wireless-enabled mobile device.

Figure 8:
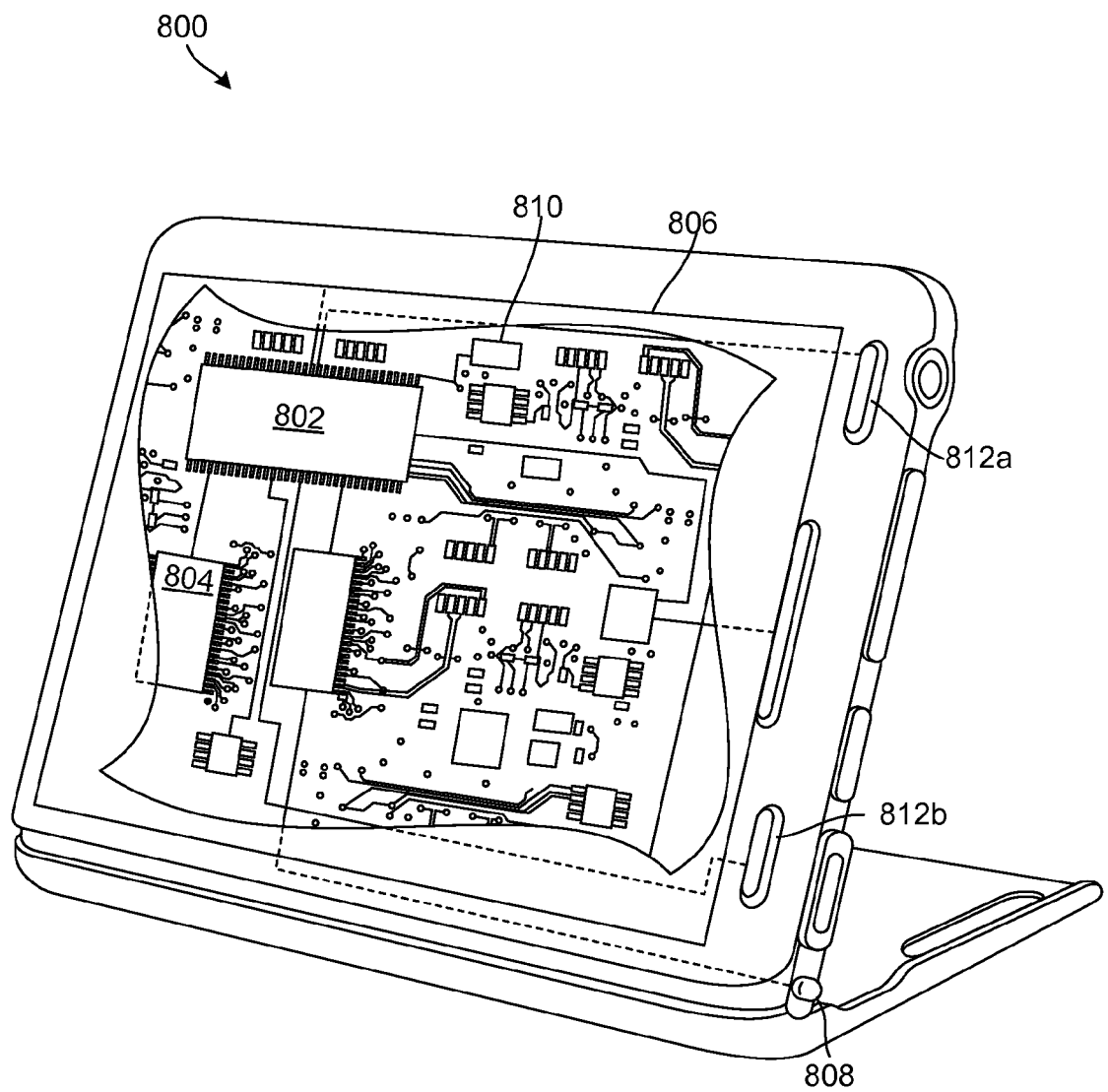
FIG. 8 is an illustration of an example mobile device suitable for use with the various embodiments.
Figure 9:
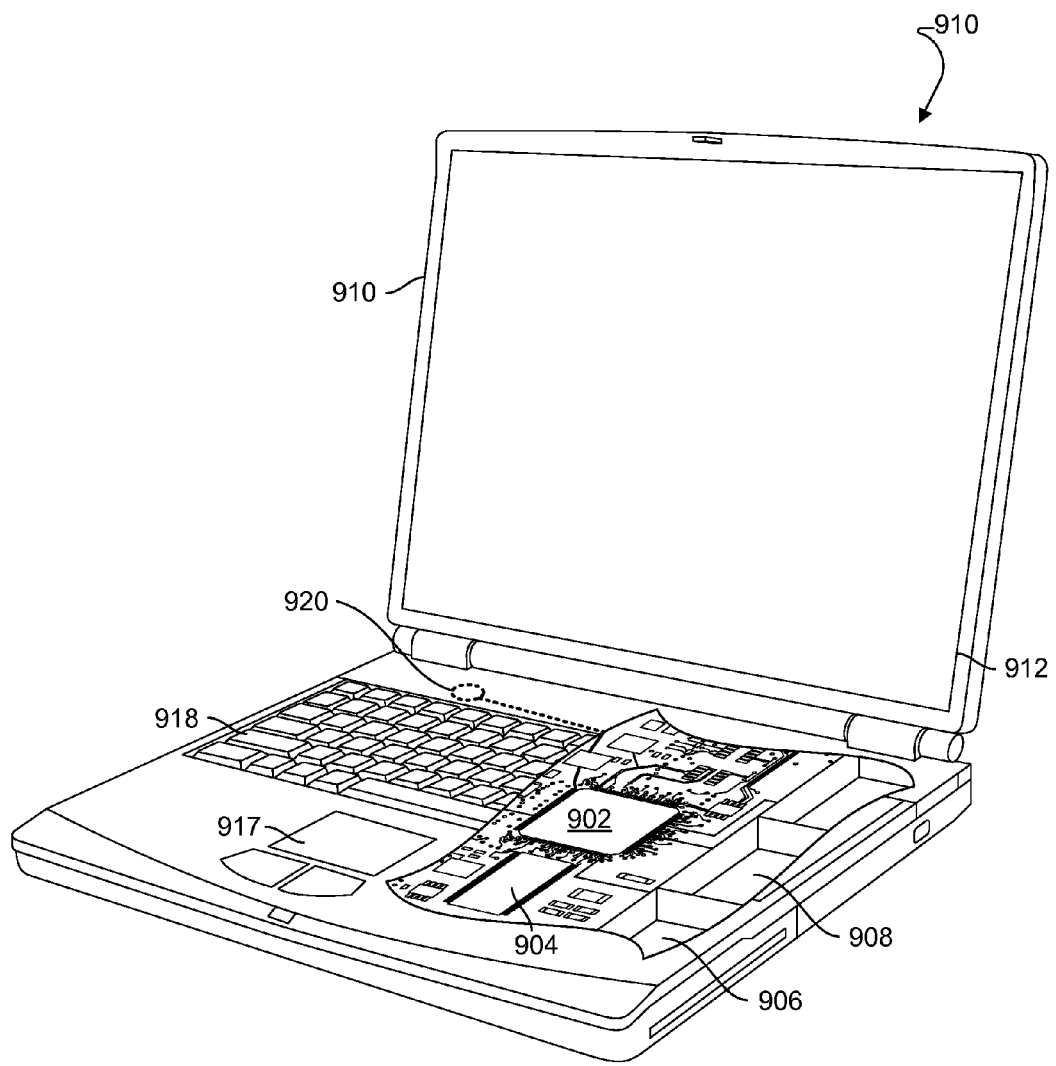
FIG. 9 is an illustration of an example laptop computer suitable for use with the various embodiments.

The various embodiments may be implemented using any commercial computing devices having an RF radio, examples of which are illustrated in FIGS. 8 and 9. Typical mobile computing devices 800 will have in common the components illustrated in FIG. 8. For example, mobile computing devices 800 may include a processor 802 coupled to an internal memory 804 and a touch surface input device/display 806, such as a resistive sensing touchscreen, capacitive sensing touchscreen, infrared sensing touchscreen, acoustic/piezo-electric sensing touchscreen, or the like. The computing device 800 may have one or more radios/antennas 808 for sending and receiving electromagnetic radiation that are connected to a wireless data link and/or cellular telephone transceiver 810 coupled to the processor 802. The radios may include a Bluetooth radio, a Wi-Fi radio, an ANT radio, etc. Computing devices 800 also typically include physical buttons 812a, 812b for receiving user inputs, one or more of which may be a push-to-talk button.

Other forms of computing devices, including personal computers and laptop computers, may be used to implementing the various embodiments. Such computing devices typically include the components illustrated in FIG. 9, which illustrates an example personal laptop computer 900. Such a personal computer 900 generally includes a processor 902 coupled to volatile memory 904 and a large capacity nonvolatile memory, such as a disk drive 906. The computer 900 may also include a compact disc (CD) and/or DVD drive 908 coupled to the processor 902. The computer device 900 may also include a number of connector ports coupled to the processor 902 for establishing data connections or receiving external memory devices, such as a network connection circuit for coupling the processor 902 to a network. The computing device 900 may have a radio/antenna 910 for sending and receiving electromagnetic radiation that is connected to a wireless data link coupled to the processor 902. The computer 900 may further be coupled to a keyboard 918, a pointing device such as a mouse or a touchpad 917, and a display 912 as is well known in the computer arts. The computer 900 may further include a push-to-talk button 920 that is coupled to the processor 902.

The processors 802, 902 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 802, 902. In some devices, the processor 802, 902 may include internal memory sufficient to store the application software instructions. In some mobile devices, the secure memory may be in a separate memory chip coupled to the processor 802, 902. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 802, 902 itself.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable storage media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating information over a Miracast infrastructure, comprising:
   negotiating a wireless communication link over the Miracast infrastructure between a first mobile device and a second mobile device, the negotiation including performing capability negotiations operations that include determining whether the second mobile device is push-to-send receive capable;
   establishing a Miracast session between the first mobile device and the second mobile device via the wireless communication link in response to determining that the second mobile device is push-to-send receive capable;
   detecting actuation of a first push-to-send button on the first mobile device;
   configuring the first mobile device as a source device in response to detecting actuation of the first push-to-send button;
   activating a microphone or camera of the first mobile device to capture audio or video in response to detecting actuation of the first push-to-send button; and
   transmitting audio or video captured by the microphone or camera of the first mobile device from the first mobile device to the second mobile device over the wireless communication link.

2. The method of claim 1, further comprising:
   establishing a back-channel wireless communication link between the first mobile device and the second mobile device over the Miracast infrastructure;
   detecting actuation of a second push-to-send button on the second mobile device;

activating a microphone or camera of the second mobile device to capture audio or video in the second mobile device in response to detecting actuation of the second push-to-send button;

transmitting audio or video captured by the microphone or camera of the second mobile device from the second mobile device to the first mobile device over the wireless communication link; and receiving, in the first mobile device, audio data or video data from the second mobile device over the back-channel wireless communication link.

3. The method of claim 1, wherein determining whether the second mobile device is push-to-send receive capable comprises:

generating in the first mobile device an M3 communication message that includes a push-to-send parameter;

transmitting the M3 communication message from the first mobile device to the second mobile device;

receiving in the second mobile device the M3 communication message that includes the push-to-send parameter;

updating the received M3 communication message in the second mobile device by adding a push-to-send value to the push-to-send parameter; and transmitting the updated M3 communication message from the second mobile device to the first mobile device.

4. The method of claim 1, further comprising:

receiving the transmitted audio or video in the second mobile device;

storing the received audio or video in a buffer of the second mobile device for a buffering duration;

retrieving the audio or video stored in the buffer of the second mobile device;

outputting the retrieved audio or video to a speaker or electronic display of the second mobile device;

determining a playback quality of outputted audio or video on the second mobile device; and adjusting the buffering duration in the second mobile device based on the playback quality.

5. The method of claim 1, wherein transmitting audio or video captured by the microphone or camera of the first mobile device from the first mobile device to the second mobile device over the wireless communication link comprises duplicating information packets with time diversity to increase a communication range of audio or video transmitted from the first mobile device and a quality of the audio or video.

6. The method of claim 2, wherein receiving, in the first mobile device, audio data or video data from the second mobile device over the back-channel wireless communication link comprises communicating in full duplex mode.

7. The method of claim 1, wherein audio or video captured by the microphone or camera of the first mobile device from the first mobile device to the second mobile device over the wireless communication link comprises communicating in half duplex mode.

8. The method of claim 1, further comprising:

detecting when the first mobile device is out of communication range of the second mobile device; and sending a communication message suitable for reestablishing the Miracast session or the wireless communication link from the first mobile device to the second mobile device in response to detecting that the first mobile device is out of communication range of the second mobile device, wherein sending the communication message suitable for reestablishing the Miracast session or the wireless communication link from the first mobile device to the second mobile device is performed repeatedly until an explicit tear down request is received in the first mobile device.

9. The method of claim 1, further comprising:

detecting low signal strength conditions in the first mobile device;

capturing text in the first mobile device in response to detecting a low signal strength conditions; and transmitting the captured text in an M3 message from the first mobile device to the second mobile device via a real-time streaming protocol (RTSP) channel.

10. A communication system for communicating information over a Miracast infrastructure, comprising:

a first mobile device comprising a first transceiver, a first push-to-send button, and a first device processor coupled to the first transceiver and the first push-to-send button; and a second mobile device comprising a second transceiver and a second device processor coupled to the second transceiver, wherein the first device processor is configured with processor-executable instructions to perform operations comprising:

negotiating a wireless communication link to the second mobile device over the Miracast infrastructure, the negotiation including performing capability negotiations operations that include determining whether the second mobile device is push-to-send receive capable;

establishing a Miracast session with the second mobile device via the wireless communication link in response to determining that the second mobile device is push-to-send receive capable;

detecting actuation of the first push-to-send button;

activating a microphone or camera to capture audio or video in response to detecting actuation of the first push-to-send button; and transmitting captured audio or video to the second mobile device over the wireless communication link.

11. The communication system of claim 10, wherein:

the first device processor is configured with processor-executable instructions to perform operations further comprising:

establishing a back-channel wireless communication link to the second mobile device over the Miracast infrastructure; and receiving audio data or video data from the second mobile device over the back-channel wireless communication link; and the second device processor is configured with processor-executable instructions to perform operations further comprising:

detecting actuation of a second push-to-send button of the second mobile device;

activating a microphone or camera of the second mobile device to capture the audio data or the video data in response to detecting actuation of the second push-to-send button; and transmitting the audio data or the video data from the second mobile device to the first mobile device over the wireless communication link.

12. The communication system of claim 10, wherein:

the first device processor is configured with processor-executable instructions to perform operations such that determining whether the second mobile device is push-to-send receive capable comprises generating an M3 communication message that includes a push-to-send parameter and transmitting the M3 communication message to the second mobile device; and the second device processor is configured with processor-executable instructions to perform operations further comprising:

receiving the M3 communication message;

updating the received M3 communication message by adding a push-to-send value to the push-to-send parameter; and transmitting the updated M3 communication message to the first mobile device.

13. The communication system of claim 10, wherein the second device processor is configured with processor-executable instructions to perform operations further comprising:

receiving the audio or video transmitted over the wireless communication link;

storing the received audio or video in a buffer of the second mobile device for a buffering duration;

retrieving the audio or video stored in the buffer;

outputting the retrieved audio or video to a speaker or electronic display;

determining a playback quality of outputted audio or video; and adjusting the buffering duration based on the playback quality.

14. The communication system of claim 10, wherein the first device processor is configured with processor-executable instructions to perform operations such that transmitting audio or video to the second mobile device over the wireless communication link comprises:

duplicating information packets with time diversity to increase a communication range of transmissions of captured audio or video and a quality of the audio or video.

15. The communication system of claim 10, wherein the first device processor is configured with processor-executable instructions to perform operations such that receiving audio or the video data from the second mobile device over the back-channel wireless communication link comprises communicating in full duplex mode.

16. The communication system of claim 10, wherein the first device processor is configured with processor-executable instructions to perform operations such that transmitting captured audio or video from the first mobile device to the second mobile device comprises communicating in half duplex mode.

17. The communication system of claim 10, wherein the first device processor is configured with processor-executable instructions to perform operations further comprising:

determining whether the first mobile device is out of communication range of the second mobile device; and sending a communication message suitable for reestablishing the Miracast session or the wireless communication link to the second mobile device in response to detecting that the first mobile device is out of communication range of the second mobile device, and wherein the first device processor is configured with processor-executable instructions to perform operations such that sending the communication message suitable for reestablishing the Miracast session or the wireless communication link to the second mobile device comprises sending the communication message repeatedly until an explicit tear down request is received.

18. The communication system of claim 10, wherein the first device processor is configured with processor-executable instructions to perform operations further comprising:

detecting low signal strength conditions;

capturing text in response to detecting a low signal strength conditions; and transmitting the captured text in an M3 message to the second mobile device via a real-time streaming protocol (RTSP) channel.

19. A mobile device, comprising:

a transceiver; and a processor coupled to the transceiver and configured with processor-executable instructions to perform operations comprising:

negotiating a wireless communication link to a second mobile device over a Miracast infrastructure, the negotiation including performing capability negotiations operations that include determining whether the second mobile device is push-to-send receive capable;

establishing a Miracast session with the second mobile device via the wireless communication link in response to determining that the second mobile device is push-to-send receive capable;

detecting actuation of a push-to-send button;

activating a microphone or camera to capture audio or video in response to detecting actuation of the push-to-send button; and transmitting audio or video captured by the microphone or camera to the second mobile device over the wireless communication link.

20. The mobile device of claim 19, wherein the processor is configured with processor-executable instructions to perform operations further comprising:

establishing a back-channel wireless communication link to the second mobile device over the Miracast infrastructure; and receiving audio or video data transmitted from the second mobile device over the back-channel wireless communication link.

21. The mobile device of claim 19, wherein the processor is configured with processor-executable instructions to perform operations such that determining whether the second mobile device is push-to-send receive capable comprises:

generating an M3 communication message that includes a push-to-send parameter;

transmitting the M3 communication message to the second mobile device; and receiving an updated M3 communication message that includes an added a push-to-send value for the push-to-send parameter.

22. The mobile device of claim 19, wherein the processor is configured with processor-executable instructions to perform operations further comprising:

receiving audio or video transmitted from the second mobile device;

storing the received audio or video in a buffer of the mobile device for a buffering duration;

retrieving the audio or video stored in the buffer;

outputting the retrieved audio or video to a speaker or electronic display of the mobile device;

determining a playback quality of outputted audio or video; and adjusting the buffering duration based on the playback quality.

23. The mobile device of claim 19, wherein the processor is configured with processor-executable instructions to perform operations such that transmitting audio or video captured by the microphone or camera to the second mobile device over the wireless communication link comprises duplicating information packets with time diversity to increase a communication range of audio or video transmitted from the mobile device and a quality of the audio or video.

24. The mobile device of claim 20, wherein the processor is configured with processor-executable instructions to perform operations such that receiving audio or the video data transmitted from the second mobile device over the back-channel wireless communication link comprises communicating in full duplex mode.

25. The mobile device of claim 19, wherein the processor is configured with processor-executable instructions to perform operations such that transmitting audio or video captured by the microphone or camera to the second mobile device over the wireless communication link comprises communicating in half duplex mode.

26. The mobile device of claim 19, wherein the processor is configured with processor-executable instructions to perform operations further comprising:
 detecting whether the mobile device is out of communication range of the second mobile device; and
 sending a communication message suitable for reestablishing the Miracast session or the wireless communication link to the second mobile device in response to detecting that the mobile device is out of communication range of the second mobile device,
 wherein sending the communication message suitable for reestablishing the Miracast session or the wireless communication link to the second mobile device is performed repeatedly until an explicit tear down request is received.

27. The mobile device of claim 19, wherein the processor is configured with processor-executable instructions to perform operations further comprising:
 detecting low signal strength conditions;
 capturing text in response to detecting a low signal strength conditions; and
 transmitting the captured text in an M3 message to the second mobile device via a real-time streaming protocol (RTSP) channel.

28. A non-transitory computer readable storage medium having stored thereon processor-executable software instructions configured to cause a processor in a first mobile device to perform operations comprising:
 negotiating a wireless communication link to a second mobile device over a Miracast infrastructure, the negotiation including performing capability negotiations operations that include determining whether the second mobile device is push-to-send receive capable;
 establishing a Miracast session with the second mobile device via the wireless communication link in response to determining that the second mobile device is push-to-send receive capable;
 detecting actuation of a push-to-send button of the first mobile device;
 activating a microphone or camera of the first mobile device to capture audio or video in response to detecting actuation of the push-to-send button; and
 transmitting audio or video captured by the microphone or camera to the second mobile device over the wireless communication link.

29. The non-transitory computer readable storage medium of claim 28, wherein the stored processor-executable software instructions are configured to cause a processor to perform operations further comprising:
 establishing a back-channel wireless communication link to the second mobile device over the Miracast infrastructure; and
 receiving audio or video data transmitted from the second mobile device over the back-channel wireless communication link.

30. The non-transitory computer readable storage medium of claim 28, wherein the stored processor-executable software instructions are configured to cause a processor to perform operations such that determining whether the second mobile device is push-to-send receive capable comprises:
 generating an M3 communication message that includes a push-to-send parameter;
 transmitting the M3 communication message to the second mobile device; and
 receiving an updated M3 communication message that includes an added a push-to-send value for the push-to-send parameter.

31. The non-transitory computer readable storage medium of claim 28, wherein the stored processor-executable software instructions are configured to cause a processor to perform operations further comprising:
 receiving audio or video transmitted from the second mobile device;
 storing the received audio or video in a buffer of the first mobile device for a buffering duration;
 retrieving the audio or video stored in the buffer;
 outputting the retrieved audio or video to a speaker or electronic display of the first mobile device;
 determining a playback quality of outputted audio or video; and
 adjusting the buffering duration based on the playback quality.

32. The non-transitory computer readable storage medium of claim 28, wherein the stored processor-executable software instructions are configured to cause a processor to perform operations such that transmitting audio or video captured by the microphone or camera to the second mobile device over the wireless communication link comprises duplicating information packets with time diversity to increase a communication range of audio or video transmitted from the first mobile device and a quality of the audio or video.

33. The non-transitory computer readable storage medium of claim 29, wherein the stored processor-executable software instructions are configured to cause a processor to perform operations such that receiving audio or the video data transmitted from the second mobile device over the back-channel wireless communication link comprises communicating in full duplex mode.

34. The non-transitory computer readable storage medium of claim 28, wherein the stored processor-executable software instructions are configured to cause a processor to perform operations such that transmitting audio or video captured by the microphone or camera to the second mobile device over the wireless communication link comprises communicating in half duplex mode.

35. The non-transitory computer readable storage medium of claim 28, wherein the stored processor-executable software instructions are configured to cause a processor to perform operations further comprising:
 detecting whether the first mobile device is out of communication range of the second mobile device; and
 sending a communication message suitable for reestablishing the Miracast session or the wireless communication link to the second mobile device in response to detecting that the first mobile device is out of communication range of the second mobile device,
 wherein sending the communication message suitable for reestablishing the Miracast session or the wireless communication link to the second mobile device is performed repeatedly until an explicit tear down request is received.

36. The non-transitory computer readable storage medium of claim 28, wherein the processor is configured with processor-executable instructions to perform operations further comprising:
    detecting low signal strength conditions;
    capturing text in response to detecting a low signal strength conditions; and
    transmitting the captured text in an M3 message to the second mobile device via a real-time streaming protocol (RTSP) channel.

37. A mobile device, comprising:
    means for negotiating a wireless communication link to a second mobile device over a Miracast infrastructure, the negotiation including performing capability negotiations operations that include determining whether the second mobile device is push-to-send receive capable;
    means for establishing a Miracast session with the second mobile device via the wireless communication link in response to determining that the second mobile device is push-to-send receive capable;
    means for detecting actuation of a push-to-send button of the mobile device;
    means for activating a microphone or camera to capture audio or video in response to detecting actuation of the push-to-send button; and
    a transmitter for transmitting audio or video captured by the microphone or camera to the second mobile device over the wireless communication link.

38. The mobile device of claim 37, further comprising:
    means for establishing a back-channel wireless communication link to the second mobile device over the Miracast infrastructure; and
    means for receiving audio or video data transmitted from the second mobile device over the back-channel wireless communication link.

39. The mobile device of claim 37, wherein means for determining whether the second mobile device is push-to-send receive capable comprises:
    means for generating an M3 communication message that includes a push-to-send parameter;
    means for transmitting the M3 communication message to the second mobile device; and
    means for receiving an updated M3 communication message that includes an added a push-to-send value for the push-to-send parameter.

40. The mobile device of claim 37, wherein further comprising:
    means for receiving audio or video transmitted from the second mobile device;
    means for storing the received audio or video for a buffering duration;
    means for retrieving the stored audio or video;
    means for outputting the retrieved audio or video to a speaker or electronic display of the mobile device;
    means for determining a playback quality of outputted audio or video; and
    means for adjusting the buffering duration based on the playback quality.

41. The mobile device of claim 37, wherein the transmitter for transmitting audio or video captured by the microphone or camera to the second mobile device over the wireless communication link comprises means for duplicating information packets with time diversity to increase a communication range of audio or video transmitted from the mobile device and a quality of the audio or video.

42. The mobile device of claim 37, wherein the transmitter for transmitting audio or video captured by the microphone or camera to the second mobile device over the wireless communication link comprises means for communicating in full duplex mode.

43. The mobile device of claim 37, wherein the transmitter for transmitting audio or video captured by the microphone or camera to the second mobile device over the wireless communication link comprises means for communicating in half duplex mode.

44. The mobile device of claim 37, wherein further comprising:
    means for detecting whether the mobile device is out of communication range of the second mobile device; and
    means for sending a communication message suitable for reestablishing the Miracast session or the wireless communication link to the second mobile device in response to detecting that the mobile device is out of communication range of the second mobile device,
    wherein means for sending the communication message suitable for reestablishing the Miracast session or the wireless communication link to the second mobile device comprises means for sending the communication message repeatedly until an explicit tear down request is received.

45. The mobile device of claim 37, wherein further comprising:
    means for detecting low signal strength conditions;
    means for capturing text in response to detecting a low signal strength conditions; and
    means for transmitting captured text in an M3 message to the second mobile device via a real-time streaming protocol (RTSP) channel.

* * * * *

UNITED STATES PATENT AND TRADEMARK OFFICE
CERTIFICATE OF CORRECTION

| | |
|---|---|
| PATENT NO. | : 9,306,992 B2 |
| APPLICATION NO. | : 13/912492 |
| DATED | : April 5, 2016 |
| INVENTOR(S) | : Praveenkumar et al. |

Page 1 of 1

It is certified that error appears in the above-identified patent and that said Letters Patent is hereby corrected as shown below:

Claims

In Column 19, Line 36, in Claim 15, delete "claim 10" and insert in its place --claim 11--.

Signed and Sealed this
Seventh Day of June, 2016

Michelle K. Lee
*Director of the United States Patent and Trademark Office*